United States Patent [19]

Enomoto

[11] 4,154,559
[45] May 15, 1979

[54] ELECTROMAGNETIC RECIPROCATING PUMP

[75] Inventor: Chouyu Enomoto, Tokyo, Japan

[73] Assignee: Enomoto Micro-Pump Mfg. Co., Tokyo, Japan

[21] Appl. No.: 846,425

[22] Filed: Oct. 28, 1977

[30] Foreign Application Priority Data

May 18, 1977 [JP] Japan .................................. 52-56167

[51] Int. Cl.² ............................................. F04B 45/04
[52] U.S. Cl. .................................................... 417/413
[58] Field of Search ................................ 417/412, 413

[56] References Cited

U.S. PATENT DOCUMENTS

| | | | |
|---|---|---|---|
| 3,635,592 | 1/1972 | Kolfertz | 417/413 |
| 3,671,151 | 6/1972 | Duke et al. | 417/413 X |

Primary Examiner—Carlton R. Croyle
Assistant Examiner—Leonard E. Smith
Attorney, Agent, or Firm—Jay M. Cantor

[57] ABSTRACT

An electromagnetic reciprocating pump having two vibrators with permanent magnets and an electromagnet adapted to cooperate with the permanent magnets to vibrate the vibrators and characterized by connector means coupling the two vibrators to allow the vibrators to vibrate conjointly, keeping a given space therebetween. With such a structure, the pump capacity is much enhanced without increasing the sizes of the permanent magnets and the electromagnet.

8 Claims, 24 Drawing Figures

FIG.9

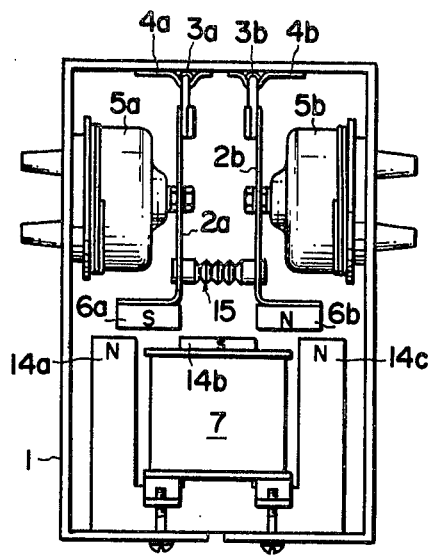
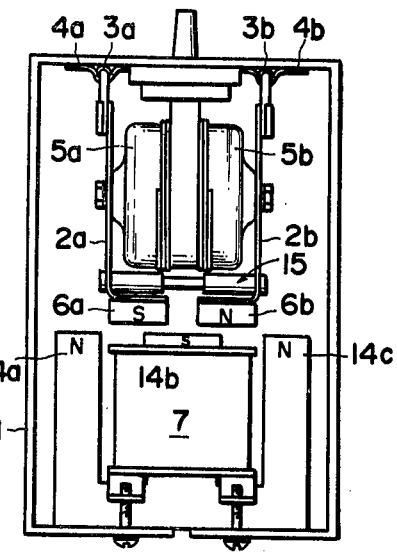
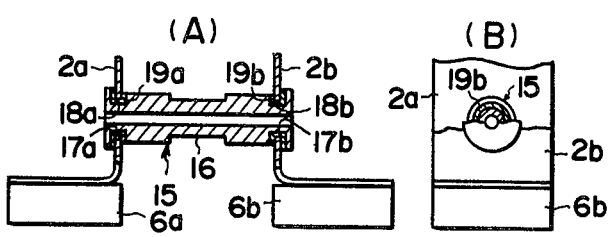
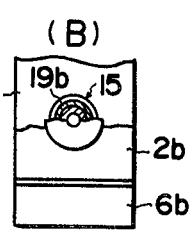
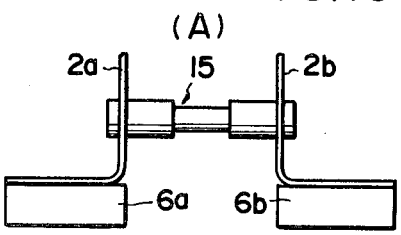
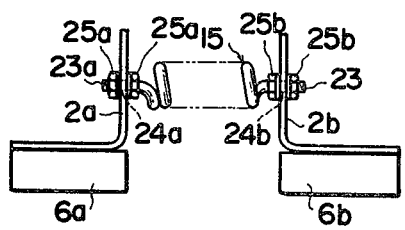
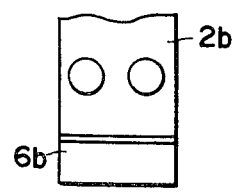

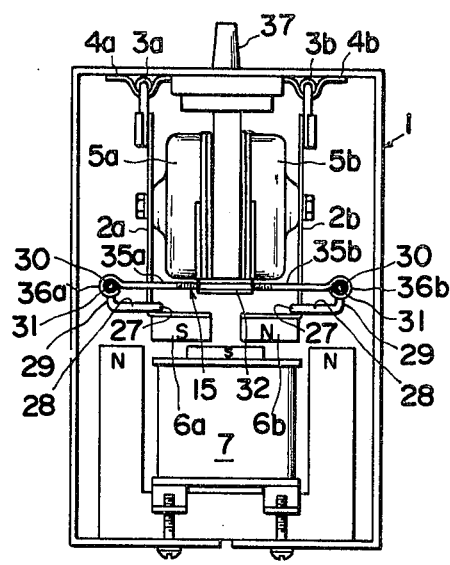
FIG. 21
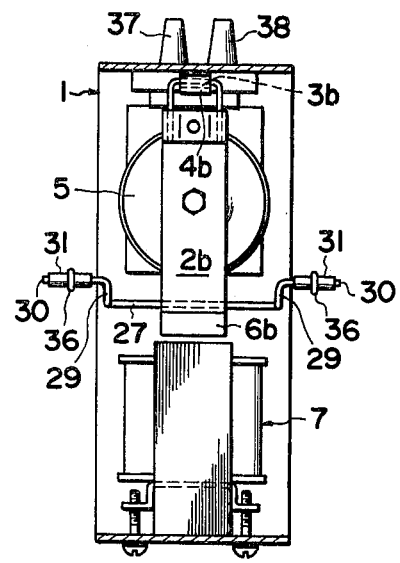
FIG. 22
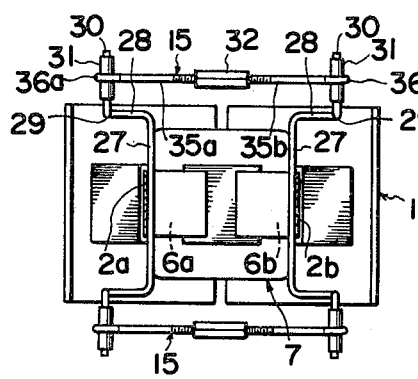
FIG. 23
FIG. 24
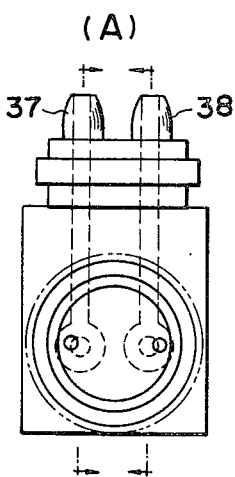
(A)
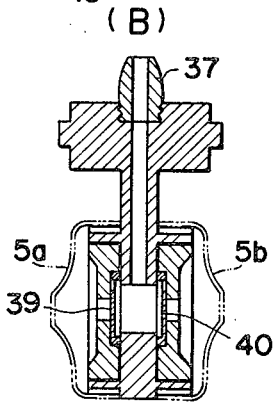
(B)
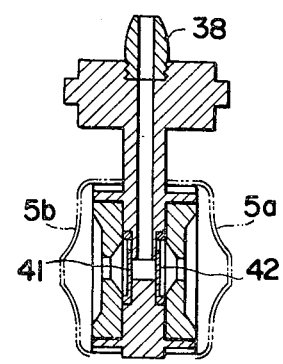
(C)

ELECTROMAGNETIC RECIPROCATING PUMP

This invention relates to an electromagnetic reciprocating pump employing an A.C. electromagnet.

A conventional electromagnetic reciprocating pump which has been widely employed for air supply is generally constructed as shown in FIGS. 1 and 2. Two L-shaped vibrators 2a, 2b are each hangingly mounted, at the respective upper ends of their upright portions, on a top plate of a housing 1 at its lower surface, by holding means 4a, 4b through rubber members 3a, 3b, respectively. Intermediate the ends of the respective upright portions are provided diaphragm pump members 5a, 5b. The diaphragm pump members 5a and 5b are mounted symmetrically outwardly in FIG. 1 and inwardly in FIG. 2. Magnetized permanent magnets 6a, 6b are each fixed to the respective vibrators 2a, 2b on the lower surfaces of the horizontal portions thereof. An A.C. electromagnet 7 is fixed to the housing 1 on an upper surface of a bottom plate thereof by means of screws so that its cores may be opposed or face to the permanent magnets 6a, 6b as shown in FIG. 1 or FIG. 2. When an A.C. voltage is applied to the electromagnet 7 to energize it, the vibrators 2a, 2b vibrate or swing round the respective supporting points of the upper ends of the upright portions to operate the diaphragm pump members 5a, 5b. The capacity of the thus constructed pump assembly highly depends on the sizes of the electromagnet 7 and the permanent magnets 6a, 6b. Accordingly, to enhance the pump capacity, i.e., to increase a suction and discharge pressure, the electromagnet 7 and the permanent magnets 6a, 6b should be made larger. However, this inevitably makes the pump assembly bulky and increases power consumption, being accompanied with economical disadvantages. Further, when the two diaphragm pump members 5a, 5b are connected in series through a pipe 8 and a discharge side 9 is used as shown in FIG. 5, the vibrators 5a, 5b vibrate independently of each other within the ranges as shown in FIG. 5 by solid lines and chain lines, due to a load applied to the respective diaphragm pump members 5a, 5b. On the other hand, when a suction side 10 is used, the vibrators 2a, 2b each vibrate separately within the ranges as shown in FIG. 6. In the both cases, the vibrators 2a, 2b do not make normal vibration. Differently stated, in either of the cases, the magnetic force of the electromagnet 7 is not effectively utilized and the pump is disadvantageously restrained to develop its full capacity.

The present invention is made to overcome such disadvantages of the conventional pump assembly as mentioned above and it is an object of the present invention to provide an electromagnetic reciprocating pump wherein both of right and left vibrators can vibrate at their respective proper positions even when a load is applied to the pump to enhance the pump capacity.

According to the present invention, there is provided an electromagnetic reciprocating pump which comprises a housing having at least a top and a bottom plate and a sidewall structure; two L-shaped vibrators hangingly provided on a lower surface of the top plate of the housing, symmetrically inwardly or outwardly, and each having respective upright portions and horizontal portions; two diaphragm pump members each mounted inwardly or outwardly on the respective L-shaped vibrators intermediates the ends of the upright portions; permanent magnets fixed to lower surfaces of the horizontal portions of the L-shaped vibrators, respectively; an electromagnet mounted on an upper surface of the bottom plate of the housing and having cores facing to the permanent magnets, whereby the vibrators vibrate, upon application of an A.C. voltage to the electromagnet, to operate the diaphragm pump members; characterized in that the vibrators are coupled with each other, at lower portions of the upright portions thereof, by connector means to vibrate conjointly, keeping substantially an original space therebetween.

The invention will be better understood from the following description taken in connection with the accompanying drawings in which:

FIGS. 9 and 10 are elevational views of the pump of FIG. 7, showing it in different states of operation;

FIG. 11 is an elevational view of another embodiment of the present invention wherein a resilient member is employed as connector means for coupling the vibrators;

FIGS. 12A and 12B are a vertical sectional view and a side elevational view, respectively, of one mode of connector means made of synthetic rubber;

FIG. 13 is a vertical sectional view of another mode of connector means made of synthetic rubber;

FIG. 14 is a vertical sectional view of a still further mode of connector means made of a coil spring;

FIG. 15 is an elevational view of a still further embodiment of the present invention wherein a resilient member is employed as connector means for coupling vibrators mounted inwardly;

FIGS. 16A and 16B are an elevational view and a side elevational view, respectively, of a still further mode of connector means comprising a plurality of resilient members;

FIG. 21 is an elevational view of a still further embodiment of the present invention wherein vibrators are coupled by a connector through resilient rods;

FIG. 22 is a partially cutaway side elevational view of the embodiment of FIG. 21;

FIG. 23 is a cross sectional view taken along the line B—B of FIG. 21; and

FIGS. 24A, 24B and 24C are a side elevational view, a sectional view taken along the line C—C of FIG. 24A and a sectional view taken along the line D—D of FIG. 24B, respectively, of a diaphragm pump member of the embodiment of FIG. 21.

Figure 7:
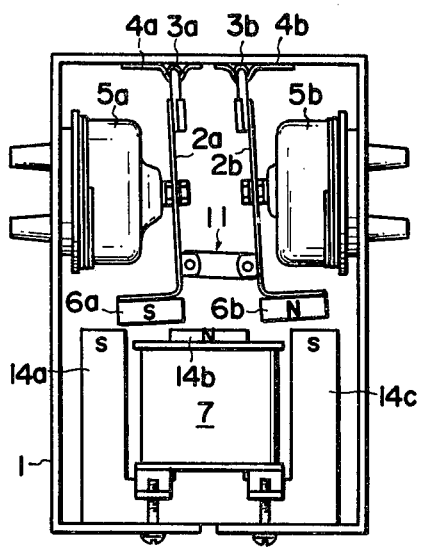
FIG. 7 is an elevational view of one embodiment of the present invention wherein a link is employed as connector means for coupling right and left vibrators.
Figure 8:
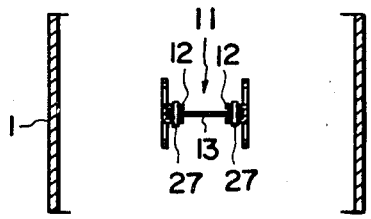
FIG. 8 is a cross sectional view taken along the line A-A of FIG. 7.

Referring now to FIGS. 7 and 8, there is illustrated one preferred embodiment of the present invention, wherein right and left vibrators 2a, 2b are coupled at lower positions of their upright portions by a connector 11. Stated illustratively, protruding holders 12 are each provided on the insides of the upright portions of the vibrators 2a, 2b at positions in the vicinity of the corners of the L-shaped vibrators 2a, 2b, respectively, and a link 13 is pivotally connected at its end portions to the holders 12 by pins 27.

Figure 1:
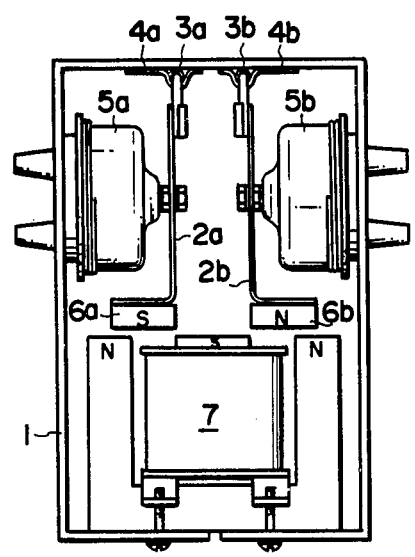
FIG. 1 is an elevational view of a conventional electromagnetic reciprocating pump with diaphragm pump members mounted outwardly therein.
Figure 2:
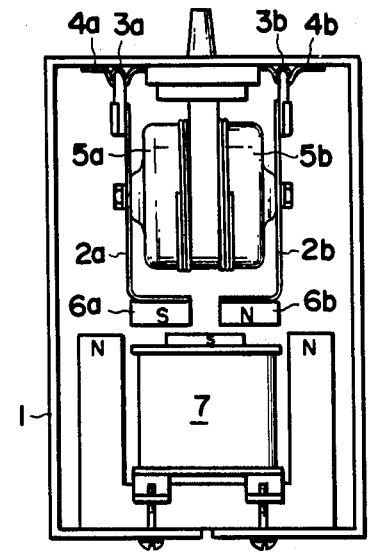
FIG. 2 is a similar elevational view of a conventional electromagnetic reciprocating pump with diaphragm pump members mounted inwardly therein.
Figure 3:
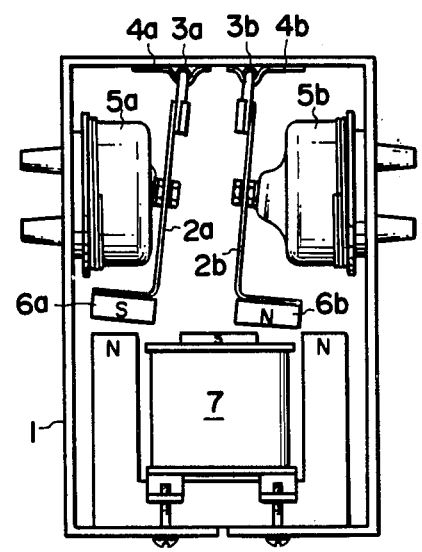
FIG. 3 is an elevational view of the pump of FIG. 1, showing it in operation.
Figure 4:
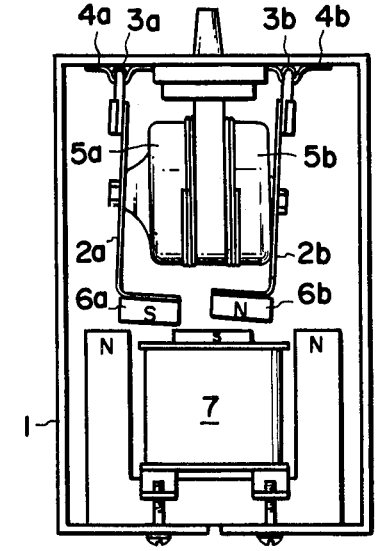
FIG. 4 is a similar elevational view of the pump of FIG. 2, showing it in operation.
Figure 5:
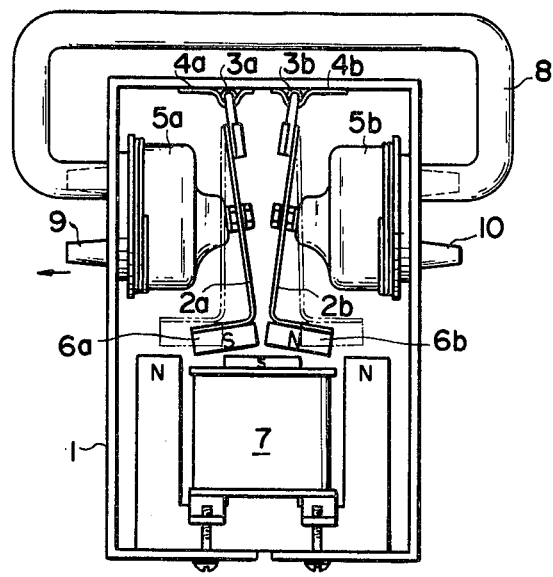
FIG. 5 is an elevational view of a conventional electromagnetic reciprocating pump with diaphragm pump members connected by a pipe, showing it in operation when its discharge side is used.
Figure 6:
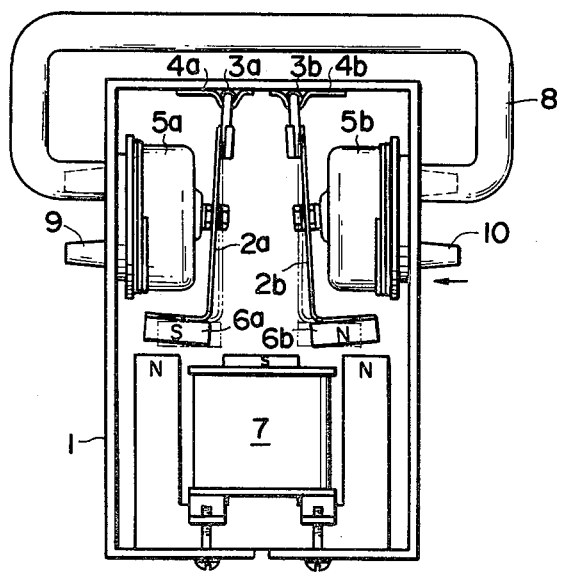
FIG. 6 is a similar elevational view of a conventional electromagnetic reciprocating pump with diaphragm pump members connected by a pipe, showing it in operation when its suction side is used.
Figure 10:
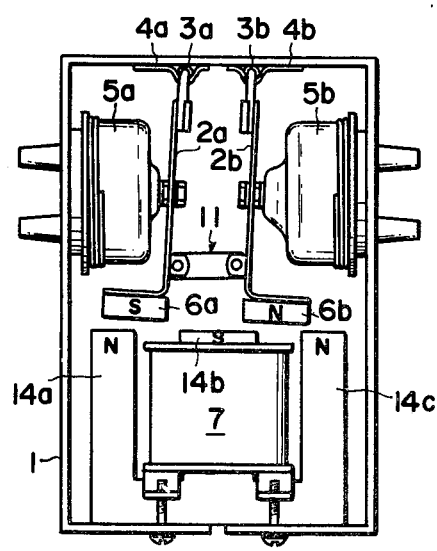

As the vibrators 2a, 2b are coupled by the connector 11 comprising the link member, the permanent magnets 6a, 6b can effectively utilize the magnetic force of the electromagnet 7. More particularly, when an A.C. voltage is applied to the electromagnet 7, the vibrators 2a, 2b vibrate more effectively as shown in FIGS. 9 and 10 as compared with the vibrators of the conventional pump in which the vibrators vibrate separately. Since the vibrators 2a, 2b vibrate conjointly in the same direction, the diaphragm pump members 5a, 5b are subjected to an increased pulling or pushing force due to synergistic effect of the vibrations of the vibrators 2a, 2b, namely, conjoint pulling and pushing. Stated illustratively, in FIG. 9, an N-pole of the permanent magnet 6b is attracted by an S-pole of a core 14c of the electromagnet 7 and, in addition thereto, an S-pole of the permanent magnet 6a is attracted to an N-pole of a core 14b of the electromagnet 7 through the link 11, so that the diaphragm pump member 5a is pulled by a larger force. In FIG. 10, the diaphragm pump member 5b is, in turn, similarly pulled by a larger face. Thus, the pump capacity is much improved. According to the results of the experiments conducted by the inventors of the present invention, the capacity of the pump according to the present invention is 1.5 multiple of that of a conventional pump which has no connector. Further, when a load is applied to the pump in such a manner as shown in FIG. 5 or 6, such undesirable behaviors, namely separate vibrations, of the vibrators 2a, 2b as in case of FIGS. 5 and 6 do not occur and the magnetic forces of the permanent magnets 6a, 6b and the electromagnet 7 are effectively utilized.

FIG. 11 shows another embodiment of the present invention wherein a connector 15 is made of a resilient material, such as a synthetic rubber, a coil spring, etc. Such a resilient connector 15 further ensures the synergistic action of the vibrators 2a, 2b and accordingly attains more effective vibrations of the diaphragm pump members 5a, 5b due to its resiliency and deflectability, thereby to provide a further improved electromagnetic pump. The resilient connector 15 has also an advantage in durability because it works as a connector of the vibrators 2a, 2b. with ease and without a strain, due to its resiliency.

In case the resilient connector 15 is made of synthetic rubber, it may be so constructed, for example, as shown in FIG. 12 wherein a through-hole is centrally provided along the exis of the connector 15 and a reduced diameter portion 16 is provided intermediate the ends of the connector 15 to impart resiliency thereto and annular grooves 17a, 17b are provided at the end portions of the connector 15, which are in engagement with holes 18a, 18b of the vibrators 2a, 2b through bushes 19a, 19b made of a synthetic resin. It may be alternatively, so constructed as shown in FIG. 13 wherein vibration insulating rubber bellows having bellows intermediate the ends are employed and headed bolts 20a, 20b are embedded, at their head portions, in the ends of the vibration insulating rubber bellows and projected, at their leg portions, through holes 21a, 21b of the vibrators 2a, 2b to be fixed by means of nuts 22a, 22b.

In case a coil spring is used for the resilient connector 15, the connector 15 may be so constructed, for example, as shown in FIG. 14 wherein the end portions of the coil spring are extended in the axial direction of the connector 15 and threaded to form external thread portions 23a, 23b which are inserted through holes 24a, 24b of the vibrators 2a, 2b and fixed by nuts 25a, 25b.

The present invention may be applied, with the same advantages, to an electromagnet reciprocating pump with diaphragm pump members mounted inwardly, to attain substantially the same effects. In case the present invention is applied to a large size electromagnet reciprocating pump, a plurality of the resilient connectors 15 may be employed to develop the full capacity of the pump.

Figure 17:
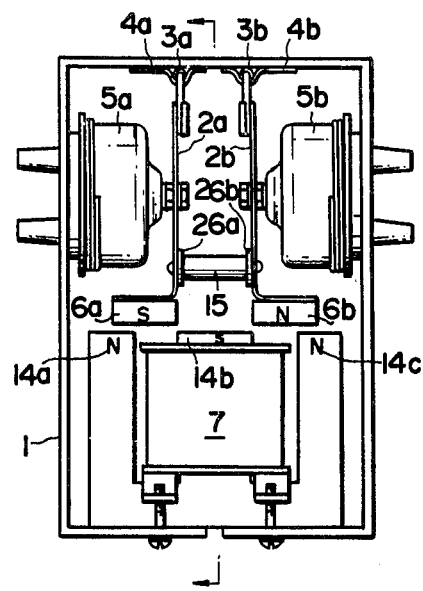
FIG. 17 is an elevational view of a still further embodiment of the present invention wherein vibrators are coupled by connectors through resilient plates.
Figure 18:
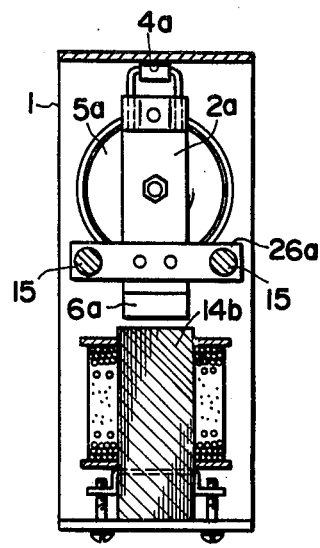
FIG. 18 is a vertical sectional view of the embodiment of FIG. 17.
Figure 19:
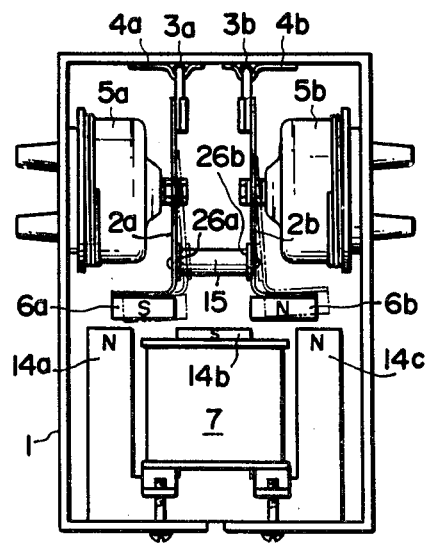
FIG. 19 is an elevational view of the embodiment of FIG. 17, showing it in operation.
Figure 20:
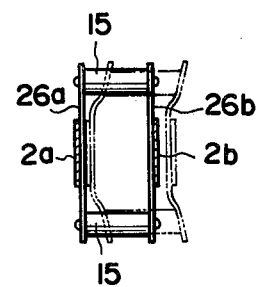
FIG. 20 is a plan view of the embodiment of FIG. 17, showing it in operation.

FIGS. 17 and 20 shows a still further embodiment of the present invention, wherein resilient plates 26a, 26b are provided, at the lower end portions of the upright portions of the vibrators 2a, 2b, at right angles with the vibration direction of the vibrators 2a, 2b and connectors, for example, resilient connectors 15 are connected to their end portions. By such a structure, not only the permanent magnets 6a, 6b can effectively utilize the magnetic force of the electromagnet 7 in operation, namely, when an A.C. voltage is applied to the electromagnet 7 and a load is applied to the pump, but also the diaphragm pump members 5a, 5b can vibrate by the forces of the two permanent magnets 6a, 6b. Stated illustratively, as shown in FIGS. 19 and 20, the diaphragm pump member 5b is pushed by the vibrator 2b and the vibration caused by the vibrator 2a is transferred to the resilient plate 26b, with some phase lag, through the resilient plate 26a, and the resilient connectors 15 connected thereto, to push the diaphragm pump member 5b. As a result, the diaphragm pump member 5b is vibrated by the forces of the two permanent magnets 6a and 6b. Thus, an extremely large vibration force is applied to the diaphragm pump members 5a, 5b and the pump capacity is largely increased.

FIGS. 21 to 23 shows a still further embodiment of the present invention wherein the diaphragm pump members 5a, 5b are mounted inwardly on the vibrators 2a, 2b. In this embodiment, resilient rods 27a, 27b are fixed inside the corners of the vibrators 2a, 2b for the convenience and the resilient rods 27a, 27b are each so formed that they are each so formed that they are first bent outwardly, then bent upwardly and further bent forwardly to provide rod portions 28, 29 and 30. At the rod portions 30, the resilient rods 27a, 27b are, in turn, connected through rubber pipes 31 to a connector 15 which comprises connecting rods 35a, 35b having an adjusting nut 32 positioned therebetween, at loop portions 36a, 36b formed at the ends of the connecting rods 35a, 35b. The effect of this embodiment is substantially the same as that of the embodiment as shown in FIGS. 17 to 20.

Though the above explanation is given particularly to the electromagnetic reciprocating pump with the diaphragm pump members 5a, 5b mounted inwardly on the vibrators 2a, 2b, the embodiment may also be applied to an electromagnetic reciprocating pump with diaphragm pump members mounted outwardly on vibrators.

The diaphragm pump members 5a, 5b of this embodiment are so constructed as shown in FIGS. 24A to 24B. FIG. 24A shows a side elevational view of the diaphragm pump members 5a, 5b, FIG. 24B a discharge side thereof and FIG. 24C a suction side thereof. 37 is a discharge opening, 38 a suction opening, 5a, 5b diaphragm pump members, 39, 40, 41 and 42 valves.

As mentioned above, according to the present invention, the vibrators are coupled by the connector to vibrate, keeping a certain space therebetween. Accordingly, one pump capacity can advantageously be enhanced without increasing a size of the permanent magnet or the electromagnet. Thus, the present invention can provide an economically advantageous electromagnetic reciprocating pump. The present invention further has a practical advantage that possible collision of the vibrators caused due to a pump load is prevented.

What is claimed is:

1. An electromagnetic reciprocating pump which comprises a housing having at least a top and a bottom plate and a sidewall structure; two L-shaped vibrators hangingly provided on a lower surface of the top plate of the housing, symmetrically inwardly or outwardly and each having respective upright portions and horizontal portions; two diaphragm pump members each mounted inwardly or outwardly on the respective L-shaped vibrators intermediates the ends of the upright portions; permanent magnets fixed to lower surfaces of the horizontal portions of the L-shaped vibratiors, respectively; an electromagnet mounted on an upper surface of the bottom plate of the housing and having cores facing to the permanent magnets, whereby the vibrators vibrate, upon application of an A.C. voltage to the electromagnet, to operate the diaphragm pump members; characterized in that the vibrators are coupled with each other, at lower portions of the upright portions thereof, by connector means to vibrate conjointly, keeping substantially an original space therebetween.

2. An electromagnetic reciprocating pump as set forth in claim 1 wherein said connector means is a link.

3. An electromagnetic reciprocating pump as set forth in claim 1 wherein said connector means is a resilient member.

4. An electromagnetic reciprocating pump as set forth in claim 3 wherein said resilient member is made of synthetic rubber having resiliency.

5. An electromagnetic reciprocating pump at set forth in claim 1 wherein said connector means is a coil spring.

6. An electromagnetic reciprocating pump as set forth in claim 1, wherein said connector means comprises resilient plates extending at right angle with the vibration direction of the vibrators and fixed to the vibrators at the lower portions of the upright portions thereof; and connectors fixed to the resilient plates at their end portions.

7. An electromagnetic reciprocating pump as set forth in claim 1 wherein said connector means comprises risilient rods each fixed to the respective vibrators, extending in the depth direction of the housing, then bent outwardly in the width direction and again bent upwardly or downwardly in the height direction and having front and rear ends; and connectors provided between the front ends of the resilient rods and between the rear ends of the resilient rods, respectively.

8. An electromagnetic reciprocating pump as set forth in claim 7, wherein said connectors are each adapted to be adjustable to vary their lengths.

* * * * *